(12) United States Patent
Neal et al.

(10) Patent No.: US 6,636,947 B1
(45) Date of Patent: Oct. 21, 2003

(54) COHERENCY FOR DMA READ CACHED DATA

(75) Inventors: Danny Marvin Neal, Round Rock, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 09/645,177

(22) Filed: Aug. 24, 2000

(51) Int. Cl.[7] .................. G06F 12/12; G06F 13/00
(52) U.S. Cl. ............... 711/141; 711/144; 711/145; 710/306; 710/312; 710/313
(58) Field of Search ................ 711/124, 130, 711/141, 144, 145, 306; 710/54–55, 308, 310–313, 315

(56) References Cited

U.S. PATENT DOCUMENTS 6,138,192 A  * 10/2000  Hausauer .................. 710/100
6,138,217 A  * 10/2000  Hamaguchi ................ 711/141
6,199,144 B1 *  3/2001  Arora et al. ............... 711/145
6,330,630 B1 * 12/2001  Bell ......................... 710/129
 ,013,089 A1 *  8/2002  Weber ....................... 711/146

* cited by examiner

*Primary Examiner*—Matthew Kim
*Assistant Examiner*—Denise Tran
(74) *Attorney, Agent, or Firm*—Robert V. Wilder; Mark E. McBurney

(57) ABSTRACT

A method and implementing computer system are provided which enable a process for implementing a coherency system for bridge-cached data which is accessed by adapters and adapter bridge circuits which are normally outside of the system coherency domain. An extended architecture includes one or more host bridges. At least one of the host bridges is coupled to I/O adapter devices through a lower-level bus-to-bus bridge and one or more I/O busses. The host bridge maintains a buffer coherency directory and when Invalidate commands are received by the host bridge, the bridge buffers containing the referenced data are identified and the indicated data are invalidated.

13 Claims, 2 Drawing Sheets

COHERENCY FOR DMA READ CACHED DATA

FIELD OF THE INVENTION

The present invention relates generally to information processing systems and more particularly to a methodology and implementation for enabling a coherency system for DMA read data in bridged systems.

BACKGROUND OF THE INVENTION

Computer Architectures generally allow implementations to incorporate such performance enhancing features as write-back caching, non-coherent instruction caches, pipelining, and out-of-order/speculative execution. These features introduce the concepts of coherency (the apparent order of storage operations to a single memory location as observed by other processors and DMA) and consistency (the order of storage accesses among multiple locations). In most cases, these features are transparent to software. However, in certain circumstances, operating system software explicitly manages the order and buffering of storage operations. By selectively eliminating ordering options, either via storage access mode bits or the introduction of storage barrier instructions, software can force increasingly restrictive ordering semantics upon its storage operations. Although the exemplary embodiment is directed toward a PowerPC platform, those skilled in the art will recognize that the following applies in general to other computer architectures.

PowerPC processor designs usually allow, under certain conditions, for caching, buffering, combining, and reordering in the platform's memory and I/O subsystems. These designs implement bus protocols which affect the memory access control and barrier operations that software uses to manage the order and buffering of storage operations. The platform's memory subsystem, system interconnect, and processors, which cooperate through a platform implementation-specific protocol to meet the PowerPC specified memory coherence, consistency, and caching rules, are said to be within the platform 's coherency domain. Bridges outside of the coherency domain cannot buffer DMA read data for an I/O adapter ahead of when the I/O adapter needs the data, otherwise the data in the bridge buffers outside of the coherency domain could get out of synchronization or non-consistent with the data in system memory.

PCI architecture provides a protocol for keeping data coherent when the I/O adapter's data are cached in the coherency domain of the system processors but not for data from the coherency domain that are buffered outside of the coherency domain.

Thus, there is a need for a method and implementing system which enables the maintenance of data coherency in systems which include data buffering beyond typical processor coherency domains.

SUMMARY OF THE INVENTION

A method and implementing computer system are provided which enable a process for implementing a coherency system for bridge-cached data which are accessed by adapters and adapter bridge circuits outside of the system coherency domains.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented within a typical computer system which may include a workstation or personal computer. In general, an implementing computer system may include a plurality of processors in a multi-bus system in a network of similar systems. However, since the workstation or computer system which may be used to implement the methodology described herein is generally known in the art, and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention.

Figure 1:
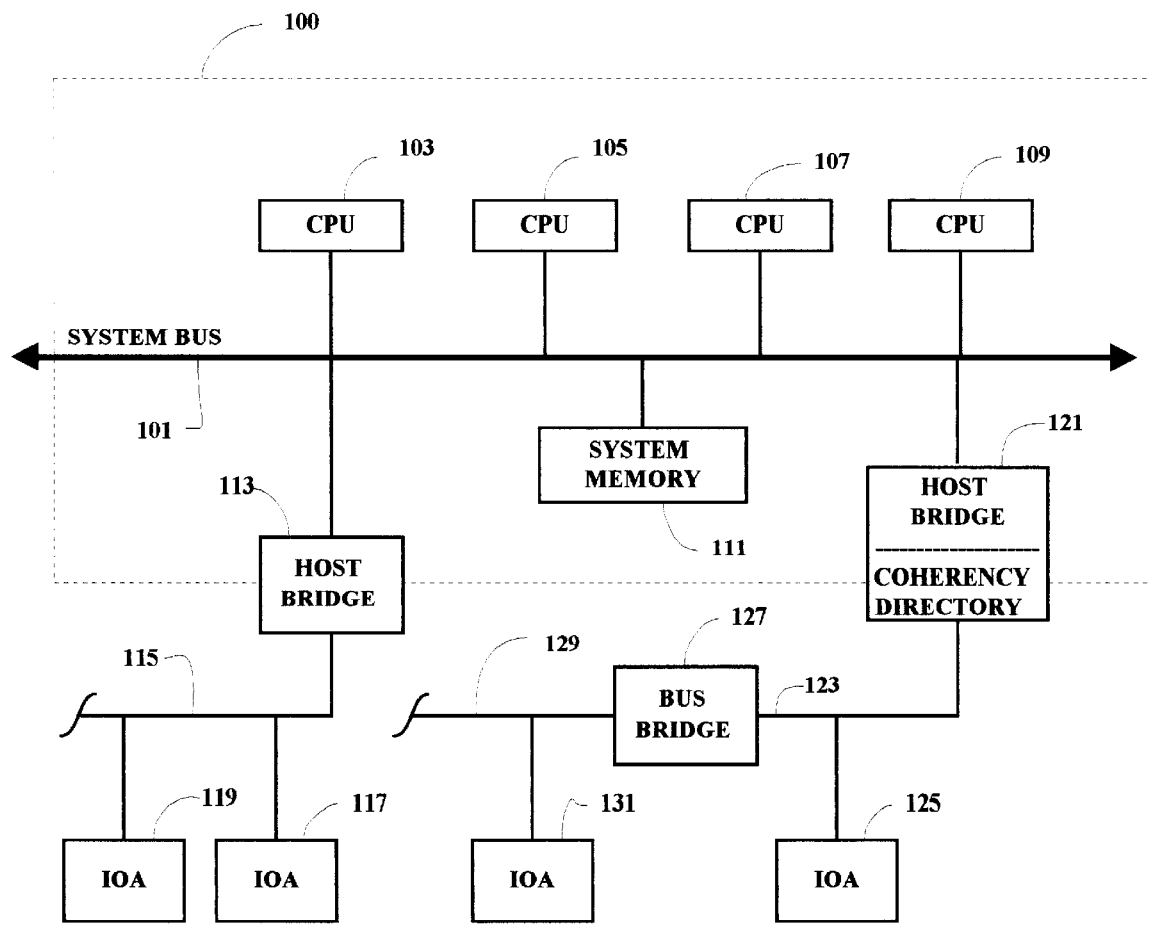
FIG. 1 is a diagram of a computer system in which the present invention may be implemented.

FIG. 1 shows an exemplary computer system which includes multiple levels of bridges and adapter busses. In FIG. 1, a system bus 101 provides for common connections to a plurality of system CPUs 103, 105, 107 and 109. Also connected to the bus 101 is a system memory 111 and first and second host bridges 113 and 121. The first host bridge 113 connects to an I/O (Input/Output) adapter bus 115 which, in turn, is connected to first and second I/O adapters 117 and 119. The second host bridge 121 connects to a second I/O adapter bus 123 which connects to a first I/O adapter 125 and also to a bus-to-bus bridge circuit 127. The bus-to-bus bridge circuit 127 connects to a secondary I/O bus 129 on the secondary side thereof, and secondary bus 129 is shown connected to another I/O adapter 131. The coherency domain of the exemplary system is within block 100.

It is noted that busses 115, 123 and 129 lie outside of the system coherency domain 100. FIG. 1 shows two I/O subsystems, each interfacing with the host system via a Host Bridge 113, 121. The system coherency domain 133 includes portions of the Host Bridges 113 and 121. This symbolizes the role of the bridge to apply PowerPC semantics to reference streams as they enter or leave the coherency domain, while implementing the ordering rules of the I/O bus architecture.

System Memory data in the Host Bridge (HB) buffers are in the processor coherency domain, and as such the HB 121 will receive an indication from the platform when any data it has fetched have become invalid and should be discarded. This data may already have been passed along to the BUS-BUS Bridge 127, but not necessarily along to an I/O adapter (IOA) 131 on the I/O bus 129 yet. Buses in the coherency domain provide a protocol for passing the coherency protocol, but I/O buses such as busses 123 and 129 (including PCI and PCI-X) do not provide that protocol.

In order to overcome this limitation, a new methodology is provided which is within the bounds of the existing I/O bus protocols (that is, no additional new I/O bus architecture), and which allows the HB to signal the BUS-BUS Bridge when its data are no longer valid. This invention proposes several ways to do this. In general, the HB will need to keep a directory of data that has been passed along to the BUS-BUS Bridge, e.g. 127, so that the HB 121 can filter the system cache invalidate protocol and prevent non-appropriate invalidates from being passed on to the BUS-BUS Bridges 127 (and thus preventing non-appropriate invalidate traffic from taking away performance on the I/O bus).

Memory, other than System Memory, is not required to be coherent. Such memory may include memory in IOAs. Storage operations which cross the coherency domain boundary are referred to as I/O operations if they are initiated within the coherency domain, and DMA operations if they are initiated outside the coherency domain and target storage within it. Accesses with targets outside the coherency domain are assumed to be made to IOAs. These accesses are considered performed (or complete) when they complete at the IOA's I/O bus interface.

Bus bridges translate between bus operations on the initiator and target buses. In some cases, there may not be a one-to-one correspondence between source and target bus transactions. In these cases the bridge selects one or a sequence of transactions which most closely matches the meaning of the transaction on the source bus. Some buses, for example PCI, define operations or allow for behaviors which do not fit naturally with certain aspects of the PowerPC architecture. Conversely, operations defined in the PowerPC architecture may have no corresponding function in the target bus architecture. For example, the coherency protocol software must not have any platform-specific implementation code, or the software will not be portable. Therefore it is a requirement that any buffering in bridges outside the coherency domain be transparent to the software and I/O Adapters (IOAs). In effect, the bus bridges that are normally outside of the coherency domain (for example bus-bus bridge 127) cannot buffer DMA read data for the IOA ahead of when the IOA needs the data unless a method is implemented for extending the coherency domain to include the data buffers in the bus bridges.

The PCI architecture provides a protocol for keeping data coherent when the IOA's data were cached in the coherency domain of the processors, but not for data from the coherency domain that are buffered outside the coherency domain. This invention proposes a method for solving this hole in the architecture for PCI and PCI-X protocols. This method also would work with other non-coherent I/O buses besides PCI and PCI-X. This function is important in order to improve DMA read performance. The problem is that when the IOA does a read of data from System Memory, there is a long latency to get the data. Therefore, it is important to fetch more data than may be necessary for the current operation and buffer it as close to the IOA as possible to reduce the latency when the IOA does need the data.

One method used in the past is to pre-fetch data to the BUS-BUS Bridge while the IOA is on the bus, and throw away any extra data as soon as the IOA gets off the bus. This is wasteful of system bandwidth, as it causes re-fetching of the same data across the same buses again when the IOA gets back on the bus and requests the data that has been discarded.

The methodology disclosed herein allows for extending the system coherency domain to include the data buffers in I/O bridges which would otherwise be outside of the coherency domain, in order to allow buffering of data in those bridges while keeping that data consistent with data in system memory.

Figure 2:
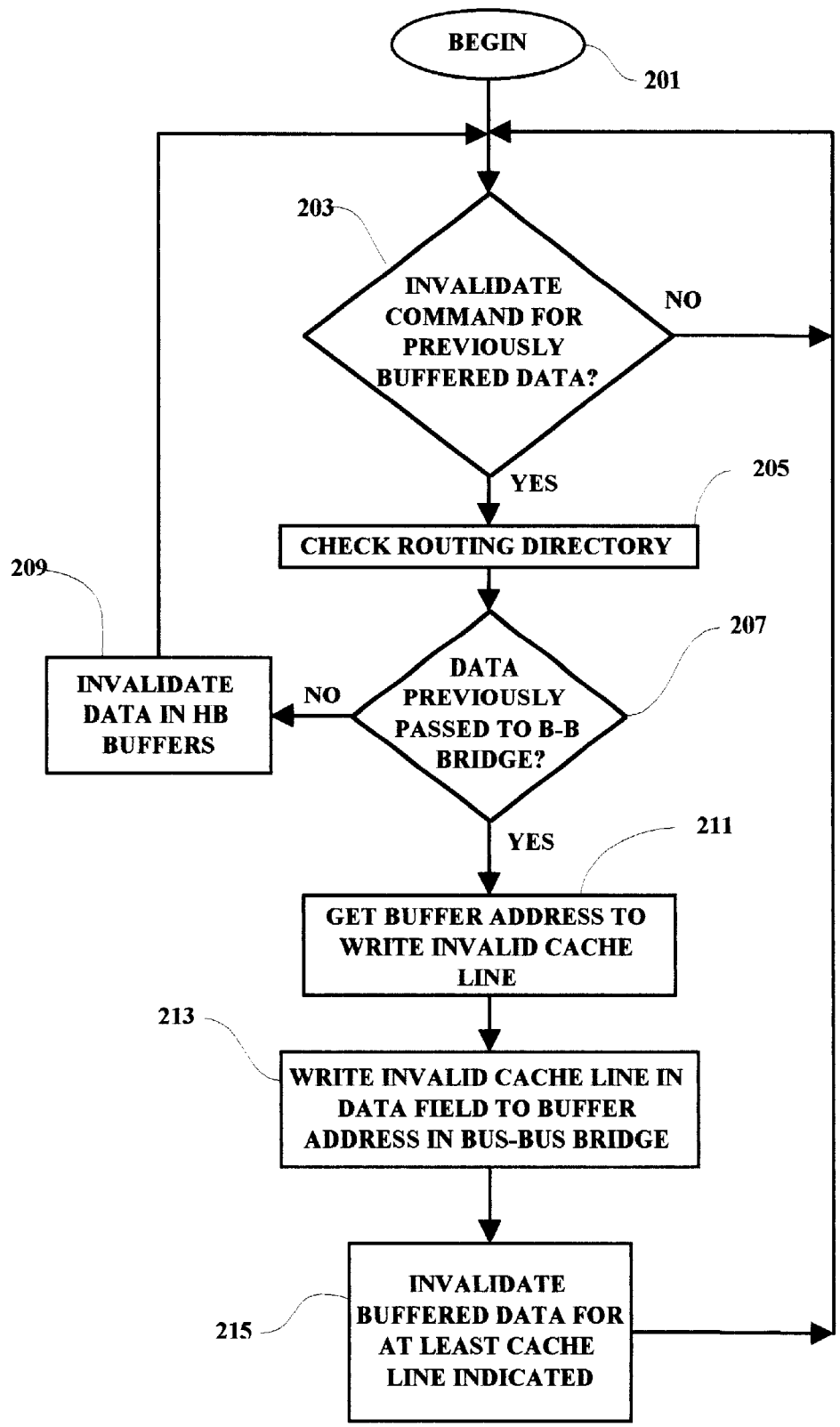
FIG. 2 is a flow chart illustrating an exemplary methodology in one implementation of the present invention.

As illustrated in FIG. 2, in a first exemplary implementation, the methodology begins 201 when the HB 121 detects an invalidate command 203 on the system bus 101 for data which the HB 121 had previously buffered and sent on to the bus-to-bus (B—B)bridge 127. A buffer coherency directory in the HB 121 would be checked 205 and if the data had not been previously passed to a B—B bridge, then the data would be invalidated in the HB buffers 209 and the process would await the next detection of an Invalidate command 203. If, however, the data to be invalidated had previously been passed to a B-B bridge 207, then the B—B bridge 127 would write to a special address 211 on the bus (defined by a configuration register in the B—B bridges) and the data written would be the address of the cache line to be invalidated 213. One of the B—B bridges would respond to the write and the others would capture the address in the data, but would not acknowledge the transfer (only one device on the bus must respond). All bridges would invalidate the data 215 in their buffers (if any) for the cache line indicated by the address in the data field of the write.

A second example is similar to the first except that the HB 121 knows what cache lines have been accessed by what bridges and writes to an address in only the appropriate bridge(s).

Alternatively, in the above examples, the data written does not include an address, but instead the special address indicates that all data in all bridges is to be invalidated. This invalidates more data than is necessary, but is simpler to implement and if not too much data are cached, this may be an acceptable implementation.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A computer system including a system coherency domain for maintaining data coherency for data transferred within said system coherency domain, and means for maintaining data coherency for data transferred to remote devices outside of said system coherency domain, said computer system comprising:

a system bus arranged for connection to at least one processor circuit;

a host bridge circuit connecting said system bus to said remote devices outside of said system coherency domain, said remote devices being operable for storing data being transferred, said host bridge circuit being selectively operable for detecting a data invalidate command to invalidate specified data previously stored in said remote devices, said host bridge circuit being further operable for writing to a predetermined address in response to said detecting, said writing to said predetermined address being operable to effect an invalidation of said specified data in said remote devices, said computer system further including a coherency directory for tracking coherency of data transfers outside of said system coherency domain, said detecting including checking said coherency directory to determine that said specified data are stored in said remote devices, wherein all data stored in at least one of said remote devices are invalidated in response to said writing.

2. The computer system as set forth in claim 1 wherein said remote devices include at least one bridge circuit arranged for connection to at least one adapter device outside of said system coherency domain, said specified data being stored within said one bridge circuit.

3. The computer system as set forth in claim 1 wherein said coherency directory is located within said host bridge circuit.

4. The computer system as set forth in claim 1 wherein only said specified data are invalidated in response to said writing.

5. A computer system including a system coherency domain for maintaining data coherency for data transferred within said system coherency domain, and means for maintaining data coherency for data transferred to remote devices outside of said system coherency domain, said computer system comprising:

a system bus arranged for connection to at least one processor circuit;

a host bridge circuit connecting said system bus to said remote devices outside of said system coherency domain, said remote devices being operable for storing data being transferred, said host bridge circuit being selectively operable for detecting a data invalidate command to invalidate specified data previously stored in said remote devices, said host bridge circuit being further operable for writing to a predetermined address in response to said detecting, said writing to said predetermined address being operable to effect an invalidation of said specified data in said remote devices, wherein said writing includes writing said given data address in a data field at said predetermined address, and wherein said specified data are specified by a given data address at which said data are stored.

6. In a computer system which includes a system coherency domain for maintaining data coherency for data transferred within said system coherency domain, a method for extending data coherency to remote devices normally outside of said system coherency domain, said method comprising:

detecting a data invalidate command on a system bus by a host bridge circuit, said host bridge circuit being connected between a system bus and remote devices outside of said system coherency domain, said remote devices being operable for storing data being transferred, said data invalidate command being selectively operable for invalidating specified data previously stored in said remote devices; and writing to a predetermined address in response to said detecting, said writing to said predetermined address being operable to effect an invalidation of said specified data in said remote devices, said computer system further including a coherency directory for tracking coherency of data transfers outside of said system coherency domain, and wherein said detecting includes checking said coherency directory to determine that said specified data are stored in said remote devices wherein all data stored in at least one of said remote devices are invalidated in response to said writing.

7. The method as set forth in claim 6 wherein said remote devices include at least one bridge circuit arranged for connection to at least one adapter device, said specified data being stored within said one bridge circuit.

8. The method as set forth in claim 6 wherein said coherency directory is located within said host bridge circuit.

9. The method as set forth in claim 6 wherein only said specified data are invalidated in response to said writing.

10. The method as set forth in claim 6 wherein said specified data are specified by a given data address at which said data are stored.

11. The method as set forth in claim 10 wherein said writing includes writing said given data address in a data field at said predetermined address.

12. A computer system including a coherency domain for maintaining data coherency for data transferred within said coherency domain, said computer system comprising:

a system bus arranged for connection to at least one processor circuit;

a host bridge circuit connecting said system bus to devices outside of said coherency domain, said devices being operable for storing data being transferred, said host bridge circuit being selectively operable for detecting a data invalidate command to invalidate specified data previously stored in said devices, said host bridge circuit being further operable for writing to a predetermined address in response to said detecting, said writing to said predetermined address being operable to effect an invalidation of said specified data in said devices, said devices including at least one bridge circuit arranged for connection to at least one adapter device, said specified data being stored within said one bridge circuit, said computer system further including a coherency directory for tracking coherency of data transfers outside of said coherency domain, and wherein said detecting includes checking said coherency directory to determine that said specified data are stored in said devices, said coherency directory being located within said host bridge circuit, wherein all data stored in at least one of said devices are invalidated in response to said writing.

13. In a computer system which includes a coherency domain for maintaining data coherency for data transferred within said coherency domain, a method for extending data coherency to devices normally outside of said coherency domain, said method comprising:

detecting a data invalidate command on a system bus by a host bridge circuit, said host bridge circuit being connected between a system bus and devices outside of said coherency domain, said devices being operable for storing data being transferred, said data invalidate command being selectively operable for invalidating specified data previously stored in said devices; and writing to a predetermined address in response to said detecting, said writing to said predetermined address being operable to effect an invalidation of said specified data in said devices, said devices including at least one bridge circuit arranged for connection to at least one adapter device, said specified data being stored within said one bridge circuit, wherein said computer system further includes a coherency directory for tracking coherency of data transfers in said coherency domain, and wherein said detecting includes checking said coherency directory to determine that said specified data are stored in said devices, wherein said coherency directory is located within said host bridge circuit, and wherein all data stored in at least one of said devices are invalidated in response to said writing.

* * * * *